United States Patent

Lotz

[11] 4,026,421
[45] May 31, 1977

[54] MEAT SLICE STACKING APPARATUS

[76] Inventor: Walter Edward Lotz, 74 Laureleaf Road, Thornhill, Canada, L3T 2Y1

[22] Filed: June 21, 1976

[21] Appl. No.: 697,969

[52] U.S. Cl. .............................. 214/6 DK; 83/79; 83/91; 214/8; 271/192
[51] Int. Cl.² ........................................ B65G 57/06
[58] Field of Search .................. 214/6 DK, 8; 83/79, 83/80, 86, 90, 91, 94; 271/189, 192, 258

[56] References Cited

UNITED STATES PATENTS

| | | | |
|---|---|---|---|
| 738,778 | 9/1903 | Cundall | 214/6 DK X |
| 2,698,692 | 1/1955 | Jones et al. | 214/6 DK X |
| 3,392,853 | 7/1968 | Mitchell et al. | 214/6 DK |
| 3,525,443 | 8/1970 | Pomara | 214/6 DK |
| 3,641,735 | 2/1972 | Daily et al. | 214/6 DK X |

Primary Examiner—L. J. Paperner

[57] ABSTRACT

The meat slice stacking apparatus includes a carrier on which meat slices are piled in discrete stacks and means for dropping successive meat slices onto the stacks; said dropping means including a trap which is alternately movable between a closed position in which it takes delivery of a meat slice from a transport and an open position in which it drops the meat slice onto the stack; the movements of the trap being governed by a sensor which senses meat slices on the transport as it carried them past a sensing station located to sense successive meat slices following the leading meat slices on the transport whereby to procure closing of the trap before said leading meat slices are respectively delivered to and seated on the trap.

13 Claims, 6 Drawing Figures

MEAT SLICE STACKING APPARATUS

The invention relates generally to apparatus for stacking relatively small, flat and sometimes fragile articles. In particular the invention is concerned with the stacking of such articles on and by a stacking facility which may be of generally conventional construction or of improved construction as visualized by a modification of the invention.

Such articles may include a variety of meat products sliced from a prepared meat loaf comprised, usually of pieces of meat into the form of a loaf and usually frozen and tempered not only for hygienic reasons but also to improve its cohesive properties and thus its handling capability, although the chilling may and often does render it, and any slices cut from it, icy and slippery as will be well understood. Said products may also include patties e.g., of hamburger; all being hereinafter compendiously referred to as meat slices.

As will also be understood, the meat loaf is pre-sliced in order to provide individual servings thereof whereas the slices are stacked, generally to re-assemble them in loaf form for convenient handling for packaging and so forth as well as to facilitate the provision of measured portions of the meat loaf.

As herein contemplated, a stacking facility may consist of a carrier or equivalent on which a plurality of stacks of meat slices are erected in spaced succession with each completed stack being comprised of a specific, predetermined, quota of units. The units are usually deposited on the facility by gravity through an escapement which overhangs the carrier and which opens to release and drop the meat slices onto the carrier in sequence until a stack is built up, after which the carrier advances to remove the stack from beneath the escapement and to present a fresh stack site.

Upon completion of each stack, the carrier advances it towards a packaging station, for example, for packaging or other handling.

Delivery of the articles to the escapement is effected by a transport from which the articles transfer in succession to the escapement under the momentum imparted thereto by the transport. Resultantly, and especially if the articles are frozen and slippery, they tend to land more or less haphazardly on the escapement. This tendency is aggravated if said articles are transported in successive groups of piles of 2 or more members, in which case not only can the group as a whole, skid and land on the escapement in a haphazard manner, but the individual members within each group may slide out of alignment with each other.

In the past, the opening of the escapement to drop articles onto the stacking facility occurred forthwith upon the landing of each article on the escapement irrespective of its posture or of the fact that it might still then be in motion. In many cases this was due to the fact that the opening of the escapement was triggered by the mere landing of the article thereon. In consequence, when the article was duly dropped on the stack below the escapement, it was not necessarily in registration with its predecessors or with any of them. Indeed, it was by no means uncommon for the opening of the escapement to be triggered prematurely, and even before an article was properly located on the trap, for release to the conveyor; conducing, thereby, to various complications which will be obvious and need not be described.

It is most desirable as will be understood that the respective articles in each stack be in general registration with each other to facilitate packaging or any other subsequent handling and it is a broad and general object of the invention to provide method and means for stacking articles as aforesaid so that they will be substantially in vertical registration with each other in the stacks.

Moreover, the invention seeks to provide method and means for stacking articles as aforesaid at a relatively rapid rate.

The general objects of the invention are achieved by the provision of stacking apparatus which includes a transport for conveying successive articles hereinafter called chip steaks from a source to a delivery station.

Means are provided at the source for loading successive meat slices on the transport in generally regularly spaced sequence. A trap at the delivery station is alternately movable between a closed position, for taking delivery of successive meat slices from said transport, and an open position for releasing them sequentially to a stacking facility.

Said transport is operable at speeds, and said meat slices are spaced on said transport to defer delivery of a succeeding meat slice to the trap pending re-closing of the trap following release of a preceding meat slice delivered thereto by said transport.

A sensor is located for sensing a meat slice being conveyed by said transport past a sensing location after the preceding meat slice has come to rest on said trap. Mechanism, operable by said sensor upon sensing a said meat slice, procures and maintains opening of the trap for the release of said preceding meat slice to the stacking facility.

Means are also provided in the meat slice stacking apparatus for curing re-closing of said trap after the release of said preceding meat slice and before delivery of the next meat slice thereto.

One embodiment of the present invention will now be described by way of example, with reference to the accompanying drawings in which:

FIG. 1. is a perspective view of meat slice stacking apparatus according to the invention;

Figure 1:
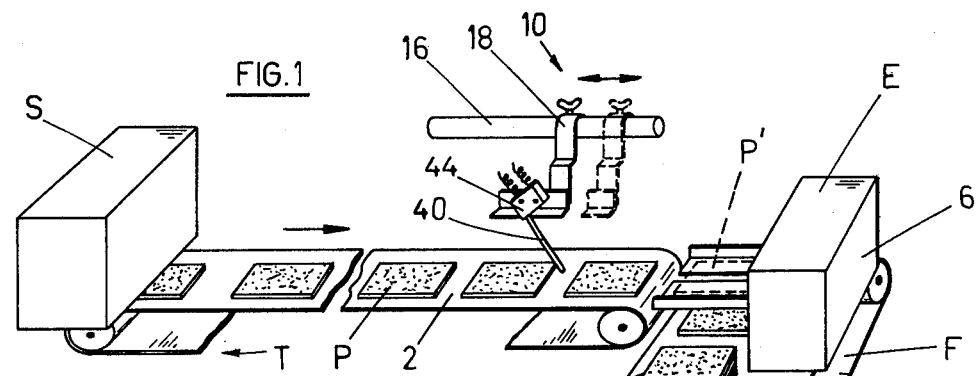

In the exemplary apparatus shown schematically in FIG. 1, S denotes a source of articles — in this example — chip steaks P which it loads automatically and in spaced order on transport T for delivery to escapement E; F being the stacking facility on which meat slices P are sequentially dropped by the overhanging escapement E.

The source S forms part of this invention only insofar as it supplies meat slices P and loads them onto the conveyor 2 which is part of the transport T. The basic structure of a suitable source S is shown diagrammatically in FIG. 2 wherein L is meat in loaf form; K is a rotary cutter which is automatically rotatable in a known manner to cut slices from the meat loaf L and to drop them on the conveyor 2; the successive slices being herein shown and identified as the meat slices P. Both loaf L and cutter K are positioned above, and raised off conveyor 2, cutter K clearing conveyor 2 in operation. As will be seen and understood, conveyor 2 passes under meat loaf L to receive the chip steaks P successively cut therefrom, which are loaded on the transport T in succession as facilitated by the continuous advancement of conveyor 2 (in the direction of the arrow) towards escapement E (FIG. 1). In practice, precise spacing of meat slices P on conveyor 2 is neither feasible nor essential. It is important however, that care be taken to ensure that meat slices P arrive at the delivery station for transfer to escapement E in uniformly spaced and oriented succession.

Escapement E includes a trap 4 which is, in fact, the specific station to which meat slices P are delivered by transport T at which point the meat slices P continue their advance, under their own acquired momentum, onto trap 4. In addition to said trap 4, the escapement E further includes means for opening and closing the trap 4 as will subsequently appear.

Figure 2:
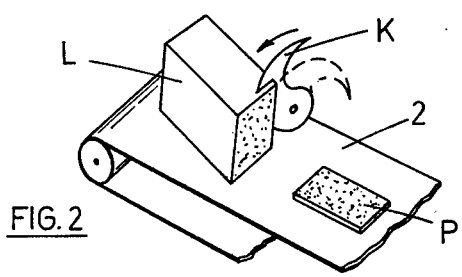
FIG. 2 is a diagrammatic view of a detail.

In the operation of the apparatus thus far described, cutter K slices meat slices P from meat loaf L as in FIG. 2, dropping them one by one onto moving conveyor 2 of transport T by which they are then taken to a delivery station, namely, at trap 4 of escapement E which is given and takes delivery of successive meat slices P from transport T in the manner described and drops them in turn, one by one, onto the stacking facility F which it overhangs.

As is implied by its title, trap 4 is capable of opening and closing; means being incorporated in the escapement E for procuring movement of trap 4 between its open and closed positions.

Figure 3:
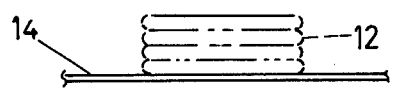
FIG. 3 is an elevational view in generally diagrammatic form of certain operative mechanism.
Figure 4:
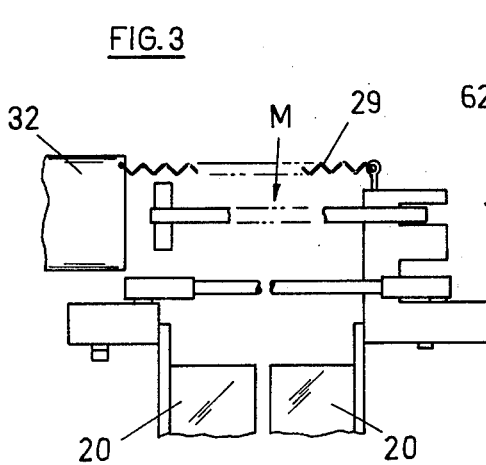
FIG. 4 is a top view of the mechanism shown in FIG. 3.

It will be appreciated that trap 4 must be in the closed position, shown by full lines in FIG. 3, to receive each successive meat slice P and must thereafter open, as shown by the broken lines in the same view, to release said meat slices onto stacking facility F; re-closing immediately afterwards for the reception of the next succeeding meat slices P, being advanced by the conveyor 2 as suggested by FIG. 1.

From the foregoing description it will be apparent that there is a necessary timing relationship between the source S and conveyor 2 for procuring approximately proper spacing of successive meat slices P on the conveyor 2; the alignment of orientation of the meat slices presenting little problem since that will be influenced by the positioning of meat loaf L.

Moreover, it has already been indicated herein that the trap 4 should be closed as and when each meat slice P arrives to seat itself thereon. Thus, the spacing of the meat slices P on conveyor 2 and the consequent rate of their delivery to trap 4 is required to be regulated according to the length of time it takes the respective meat slices to be released to the stacking facility F after reaching trap 4 permitting re-closing of trap 4 in time for the next meat slice P.

It is re-iterated that meat slices P leave transport T to land on trap 4 under their own momentum imparted thereto by conveyor 2 and it is still further re-iterated that they may, at that time, be slippery due to chilling and consequent icing.

Indeed, meat slices P have been known to leave transport T under momentum sufficient to cause them to strike and rebound from the box 6 containing escapement E.

To meet this contingency, and to avoid the obvious disadvantages thereof, the invention provides that the opening of trap 4 be unresponsive to the arrival thereon of a chip steak P, unlike many of the stacking means previously known, but that it be triggered to open, instead, by other means, as and when each meat slice P is finally seated and has come to rest on trap 4.

To this end, the invention provides a sensor 10 which is located to sense each meat slice P as the transport T carries it past the station at which the sensor 10 is located and the trap-opening means to be described is made responsive to said sensor 10 to procure opening of trap 4 as and when each meat slice P is sensed as aforesaid in its turn.

Thus, the trap 4 will not open in response to the landing of a meat slice P thereon but the actual opening thereof will be deferred pending the sensing of the following meat slice P by said sensor 10.

In the ideal practice of this invention the timing is such that the sensor 10 will not trigger the opening of trap 4 until the preceding meat slice P has substantially finished rebounding and has come to rest on trap 4 at which point, the opening of trap 4 and release of the meat slices P will be effected with minimum complication and with the meat slices P appropriately oriented to drop onto stack 12 in general registration with its previously stacked predecessors.

By means well-known in the prior art and hence not requiring description herein, successive meat slices P landing on each stack 12 are counted and when the full quota has been reached, carrier 14 which forms part of stacking facility F (which is described more fully below), the stack 12 advances towards a packaging station, for example, (not shown); thus removing it from beneath escapement E and presenting, in its place, a succeeding and vacant stack site on carrier 14.

In the meantime, as and when the trap 4 has released a preceding meat slice P to the stacking facility F, re-closing of the trap 4 is effected (by mechanism M to be described) in time to receive and seat the next succeeding and leading meat slice P delivered thereto by transport T; it being obvious that the spaces between successive meat slices P on conveyor 2 are proportioned to permit opening and re-closing of trap 4 in time to release one meat slice P and to receive its successor.

In practice, for reasons including the fact that such spacing may not be precisely uniform, the invention has found it most expedient to provide that sensor 10 trigger opening of trap 4 when it senses a meat slice P following the leading meat slice on conveyor 2. In other words, it is not the meat slice P on the trap 4 nor the first immediately following it on conveyor 2 which triggers opening of trap 4 but the second in line on the conveyor 2 which is sensed by sensor 10. Actually, the selection of the specific meat slice P in the sequence which is to be sensed is optional to a degree according, for example, to the speed of the apparatus, the size and nature of the chip steaks P and their spacing on conveyor 2. However, irrespective of which meat slice P is selected for sensing purposes, it is important that it be sensed while it is on the conveyor 2 and before it reaches trap 4.

Moreover, to compensate for various sizes of meat slices P, the sensor 10 is made movable on its mounting 16 in the axial direction of conveyor 2; being supported on carriage 18 which rides back and forth and may be set at any intermediate position on said mounting 16.

As will be evident from previous comments, one meat loaf L may vary from another in cross sectional dimensions or contours, and to a degree such variation may be compensated for by suitable adjustment and re-positioning of sensor 10 on its mounting 16.

On the other hand, when and if it is necessary, the invention provides other compensatory provisions for use in circumstances dictated by special meat slices size or shape.

Before dealing with these other provisions, it is deemed expedient to review some essential structure of escapement E, and of the operating mechanism M.

In a simple form thereof, trap 4 includes a pair of spatulate or blade-like vanes 20—20 which are disposable in close collateral horizontal and co—planar relation to provide a meat slice landing stage at the delivery station of conveyor 2. In, what is herein termed, the closed position of trap 4, said vanes 20—20 are movable (from this horizontal closed position) to the broken line open position of FIG. 3 in which they are separated whereby a meat slice P theretofore supported by vanes 20—20 in their closed position is released and allowed to drop. Said vanes 20—20 are carried on radial arms 22—22 which are mounted for swinging about centres 24—24; the vanes 20—20 being respectively attached to the radial arms 22—22 at short distances from the centres 24—24 and project perpendicularly therefrom so as to describe symmetrical arcs x—x, when the radial arms 22—22 are swung about their centres 24—24. As will be apparent, the respect termini of each arc x are the closed and open positions of trap 4.

One of said radial arms 22 has an axial extension 26 extending away form the vane 20 and this is linked by coupling rod 28 to the other radial arm 22 between swing centre 24 and vane 20. By this expedient the radial arms 22—22 are interconnected for simultaneous movement towards or away from each other (closed and open positions); being biased to closed position by an interconnecting spring 29.

One of said radial arms 22 is connected to the armature 30 of a solenoid 32 which, when energized, draws said radial arm 22 towards open trap position against the bias of spring 29 which in turn procures re-closing of trap 4 upon discontinuance of the energization.

Sensor 10 may comprise a feeler 40, photo-electric cell 42 (shown alternatively in FIG. 5) or any other of many well-known transducers of equivalent sensitivity. Whichever is used, however, it procures closing of switch 44 in an electrical circuit including a suitable source of power and the armature of solenoid 32 (FIG. 5).

Optionally, a timer 46 may also be included in said circuit in which case the opening of switch 47 would permit the timer 46 to limit the "on" period of the circuit and hence the duration of the period during which the solenoid 32 is powered. This particular facility would be of benefit when and if the meat slices P are unduly long since it could be set to reduce the open phase of the trap 4 cycle.

Figure 5:
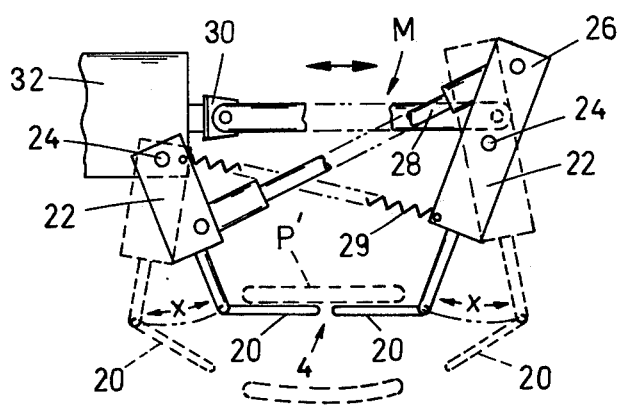
FIG. 5 is a diagram of a circuit controlling the operation of the device.
Figure 5:
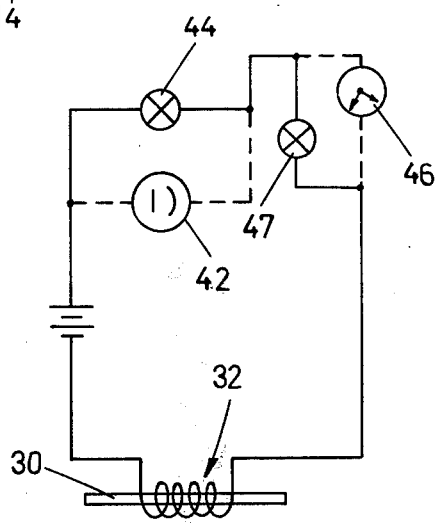

Resuming discussion of the operation of the present device, it will be observed that as each meat slice P passes sensor 10, it is felt or scanned as the case may be thereby procuring closing of the electrical circuit shown in FIG. 5 which includes solenoid 32 which is resultantly powered, and draws armature 30 to swing radial arms 22—22 and vanes 20—20 to open trap position (shown by broken lines in FIG. 3) which is maintained for a period of time predetermined either by a dimension of the sensed meat slice P or for such lesser period of time as may be set by timer 46.

The meat slice P, sensed as aforesaid, is thereafter carried by conveyor 2 to the transport discharge station, from which point it thereafter leaves the transport T under its own momentum and lands on trap 4; the general timing of the apparatus being selected to ensure that the meat slice P landing on the trap 4 will have sufficient opportunity to come to rest thereon before the sensor 10 next senses another succeeding meat slice P and triggers re-opening of trap 4.

It will be recalled that the broad contention of the invention is to provide apparatus facilitating stacking of the meat slices P in regular stacks 12 to facilitate, expedite and generally enhance the convenience in the handling of meat slices P subsequent to the slicing thereof and reassembly into loaf form.

To this end, the invention also visualizes a modification in the carrier 14 which will contribute further to the orientation of meat slices P in their stacks 12.

Figure 6:
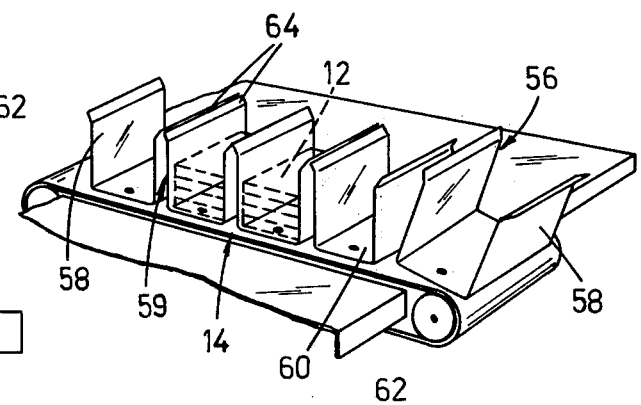
FIG. 6 is a perspective view of a modification.

Such modification, illustrated in FIG. 6, is designed to facilitate and enhance desirable meat slices alignment being especially helpful in this regard under some operating conditions One such condition may obtain, for example, when meat slices P are delivered to the trap 4 in groups of 3, pre-stacked one on the other as is sometimes done. The groups being then treated in the same manner as individual meat slices P, being dropped through trap 4 onto a stack 12 positioned therebelow.

Said modification comprises means for partitioning carrier 14 to interpose partitions between each pair of adjacent stacking sites, providing, in effect an individual walled compartment for each stack 12.

For this purpose the invention provides a plurality of more or less identical short channel members 56, respectively comprised pf a pair of flanges 58—58 joined together in spaced relation by a web 60; the spacing between the flanges 58—58 being designed to accomodate meat slices of a size usually handled by the channel members 56. Channel members 56 are shown as secured to carrier 14 although it will be obvious that their webs 60 may be articulately interconnected with each other to substitute for the specific carrier 14, heretofore described.

Except when rounding a pulley 62, each channel member 56 is closely followed by its next succeeding neighbour, so that flange 58 of the following channel member 56 is disposed in close collateral adjacency to flange 58 of the preceding channel member 56; the two flanges 58—58 combining to constitute a partition 59, separating two adjacent stacking sites provided, in this instance, by webs 60—60 of the two channel members 58—58.

In the construction illustrated and described, it will be seen that as each channel member 56 rounds a pulley 62 it deflects away from its next succeeding neighbour in a way which will be well understood and is suggested in FIG. 6 in any event. Ideally, the upper edges 64 of the flanges 58 are shaped to cam the meat slices P into one channel member 56 or the other depending of course on their location below trap 4; the shaping being bevelling as shown in FIG. 6 or the like.

Obviously the shaping of each upper flange edge 64 is complementary to the shaping of edge 64 of the adjacent flange 54 which is collateral thereto in partition 59.

As will be understood, said camming edges 64 are paricularly useful for guiding misaligned meat slices into more or less preliminary alignment with each other while stacking proceeds.

More precise alignment of meat slices P a stack 12 is facilitated by flanges 58 of channel members 56. As stacking proceeds, carrier 14, is of course, advanced carrying successive channel members 56 around pulley 62 deflecting them from their upright attitude. It can easily be seen that as each channel member 56 tilts its meat slice stack 12, will likewise tilt and slide against the now lower flange 56 urging the meat slices P into more precise alignment with each other in the stack 12.

The foregoing description of the invention and its operation has been based on the concept that the meat slices P sliced by cutter K from loaf L fall singly onto transport T for individual handling until stacked as described. Conversely, and in point of fact, it is often expedient to pile meat slices 2 or 3 high on transport T; each pile or group of 2 or 3 meat slices P being then conveyed as a unit to trap 4 and processed therethrough onto a stack 12.

Not only does the invention remain completely operative with the grouping of meat slices P as aforesaid but in fact its advantages and benefits become more obvious under these conditions.

The foregoing description has also omitted mention of the practice of interleaving meat slices or groups of meat slices with separation sheets, which of course, serve the purpose of preventing the stacked meat slices from freezing together. It will be appreciated however, that the invention does not depend on interleaving and interleaving does not form a part thereof.

Various modifications to the described embodiment, within the scope of the invention will be apparent to those skilled in the art, the scope of the invention being defined in the appended claims.

What I claim is:

1. In meat slice stacking apparatus:
   a transport for conveying successive meat slices from a source to a delivery station;
   means at said source for loading successive meat slices on said transport in generally regularly spaced sequence;
   a trap at said delivery station alternately movable between a closed position for taking delivery of successive meat slices from said transport and an open position for releasing them sequentially to a stacking facility, said transport being operable at speeds and said meat slices being spaced on said transport to permit re-closing the trap following release of a meat slice as aforesaid before a succeeding meat slice is delivered thereto by said transport;
   a sensor located for sensing a meat slice being conveyed by said transport past a sensing location after a preceding meat slice has come to rest on said trap;
   mechanism operable by said sensor upon sensing a said meat slice to procure and maintain opening of the trap for the release of the said preceding meat slice to the stacking facility; and
   means for procuring re-closing of said trap after the release of said preceding meat slice and before delivery of another meat slice thereto.

2. Apparatus according to claim 1 including a timer for limiting the time during which said mechanism is operable by said sensor as aforesaid while sensing a meat slice.

3. Apparatus according to claim 1 in which the sensor is located to sense at least the second meat slice in line for delivery to the trap.

4. Apparatus according to claim 3 in which the sensing location is variable in the direction of the movement of the meat slices from the source to the delivery station.

5. Apparatus according to claim 4 in which the sensor includes an electronic transducer which emits a signal when a meat slice is sensed initiating operation of the mechanism to procure and maintain opening of said trap.

6. Apparatus according to claim 1 including a carrier forming part of said stacking facility to which the meat slices are released by the trap, said carrier having a plurality of stacking sites and being advanceable to dispose a fresh stacking site below the trap when the next preceding stacking site has received its quota of meat slices,
   partitions separating said stacking sites forming said stacking sites into walled compartments, each of said partitions having a camming formation on its upper portion for camming meat slices into a compartment.

7. Apparatus according to claim 6 wherein the carrier is an endless device on which the partitions are perpendicularly disposed.

8. Apparatus according to claim 7 in which each said partition is comprised of two plates disposable in close collateral adjacency and the upper portion of each plate is shaped to co-operate with the upper portion of the collateral plate to provide the camming formation as aforesaid.

9. Apparatus according to claim 8 wherein said camming formation is a bevel.

10. Apparatus according to claim 8 including webs providing said stacking sites; adjacent webs being articulatably interconnected.

11. Apparatus according to claim 10 in which said carrier is comprised of said webs.

12. Apparatus according to claim 1 in which the sensor is located to sense at least the second meat slice in line for delivery to the trap and in which the sensing location is variable in the direction of movement of the meat slices from the source to the delivery station and includes an electronic transducer which emits a signal when a meat slice is sensed, initiating operation of the mechanism to procure and maintain opening of said trap and a timer for limiting the time during which said mechanism is operable by said sensor as aforesaid while sensing a meat slice.

13. Apparatus according to claim 12 including an endless carrier forming part of said stacking facility to which the meat slices are released by the trap; said carrier comprising webs providing stacking sites, adjacent webs being articulatably interconnected, and being advanceable to dispose a fresh stacking site below the trap when the next preceding stacking site has received its quota of meat slices,
   partitions, perpendicularly disposed on said carrier separating said stacking sites and forming said stacking sites into walled compartments, each said partition being comprised of two partition plates disposed in close collateral adjacency, the upper portion of each partition plate shaped to co-operate with the upper portion of the collateral partition plate to provide the camming formation as aforesaid, said camming formation being a bevel.

* * * * *